United States Patent
Bonnet et al.

(10) Patent No.: US 9,064,649 B2
(45) Date of Patent: Jun. 23, 2015

(54) DEVICE FOR DETECTING THE STATE OF A SWITCH

(75) Inventors: Guillaume Bonnet, Bazus (FR); Mathieu Dulaur, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 992 days.

(21) Appl. No.: 12/295,884

(22) PCT Filed: Apr. 3, 2007

(86) PCT No.: PCT/EP2007/053231
§ 371 (c)(1),
(2), (4) Date: Oct. 20, 2009

(87) PCT Pub. No.: WO2007/113295
PCT Pub. Date: Oct. 11, 2007

(65) Prior Publication Data
US 2010/0052705 A1    Mar. 4, 2010

(30) Foreign Application Priority Data

Apr. 4, 2006  (FR) ...................................... 06 02915

(51) Int. Cl.
*H01H 9/16*    (2006.01)
*H01H 1/60*    (2006.01)
(Continued)

(52) U.S. Cl.
CPC .............. *H01H 1/605* (2013.01); *H01H 9/167* (2013.01); *H01H 71/04* (2013.01); *H02H 3/04* (2013.01)

(58) Field of Classification Search
CPC ............................... H01H 1/605; H01H 9/167
USPC .......................................................... 324/421
See application file for complete search history.

(56) References Cited

U.S. PATENT DOCUMENTS 3,281,829 A * 10/1966 Baumgartner ................ 341/105
4,588,978 A *  5/1986 Allen ............................ 340/448
(Continued)

FOREIGN PATENT DOCUMENTS

DE           10124910 A1    12/2002
DE           10347979 A1     5/2005
(Continued)

OTHER PUBLICATIONS

Spichale, Thomas, DE 10124910 (A1) machine translation, p. 1-4.*
(Continued)

*Primary Examiner* — Thomas F Valone
(74) *Attorney, Agent, or Firm* — Greer Burns & Crain Ltd.

(57) ABSTRACT

A device for detecting the state of a switch. The device includes a detection circuit which delivers a signal of specified value ($V_{pullup}$) when the value of an electrical quantity ($R_{Sw}$) characterizing the state of the switch is less than a threshold called the lower threshold ($R_{closed}$) and/or a signal of different value when the value of the electrical quantity is greater than a threshold different from the lower threshold, called the upper threshold ($R_{open}$). The disclosed embodiments also concern flight control systems, in which the device is implemented, and the aircraft including the systems.

11 Claims, 3 Drawing Sheets

(51) Int. Cl.
H01H 71/04 (2006.01)
H02H 3/04 (2006.01)

(56) References Cited

U.S. PATENT DOCUMENTS

| | | | |
|---|---|---|---|
| 4,602,134 A * | 7/1986 | Atkinson et al. | 379/27.01 |
| 5,488,323 A | 1/1996 | Beacham, Jr. | |
| 5,668,508 A * | 9/1997 | Pulvirenti et al. | 331/111 |
| 6,593,758 B2 * | 7/2003 | Mulera et al. | 324/713 |
| 2003/0025515 A1 | 2/2003 | Mulera et al. | |

FOREIGN PATENT DOCUMENTS

JP  11022980  1/1999
JP  2002343171  11/2002

OTHER PUBLICATIONS

Dietzel, Bernd, DE 10347979 machine translation, p. 1-6.*
Van der Goes et al., A simple and accurate dynamic voltage divider for resistive bridge Transducers, IMTC '94, 0-7803-1880-3, p. 784-787.*
Sifuentes et al., Improved direct interface circuit for resistive full- and half-bridge sensors, 2007 4th Inter. Conf. Electrical and Electronics Engineering (ICEEE 2007), p. 197-201.*
Yurish, Sergey. Univesal interfacing circuit for resistive-bridge sensors, 2010 First Conf. on Sensor Device Tech. and Applic., 2010, p. 211-217.*
International Search Report dated Jun. 6, 2007.

* cited by examiner $R_{inter} = R_{switch}$

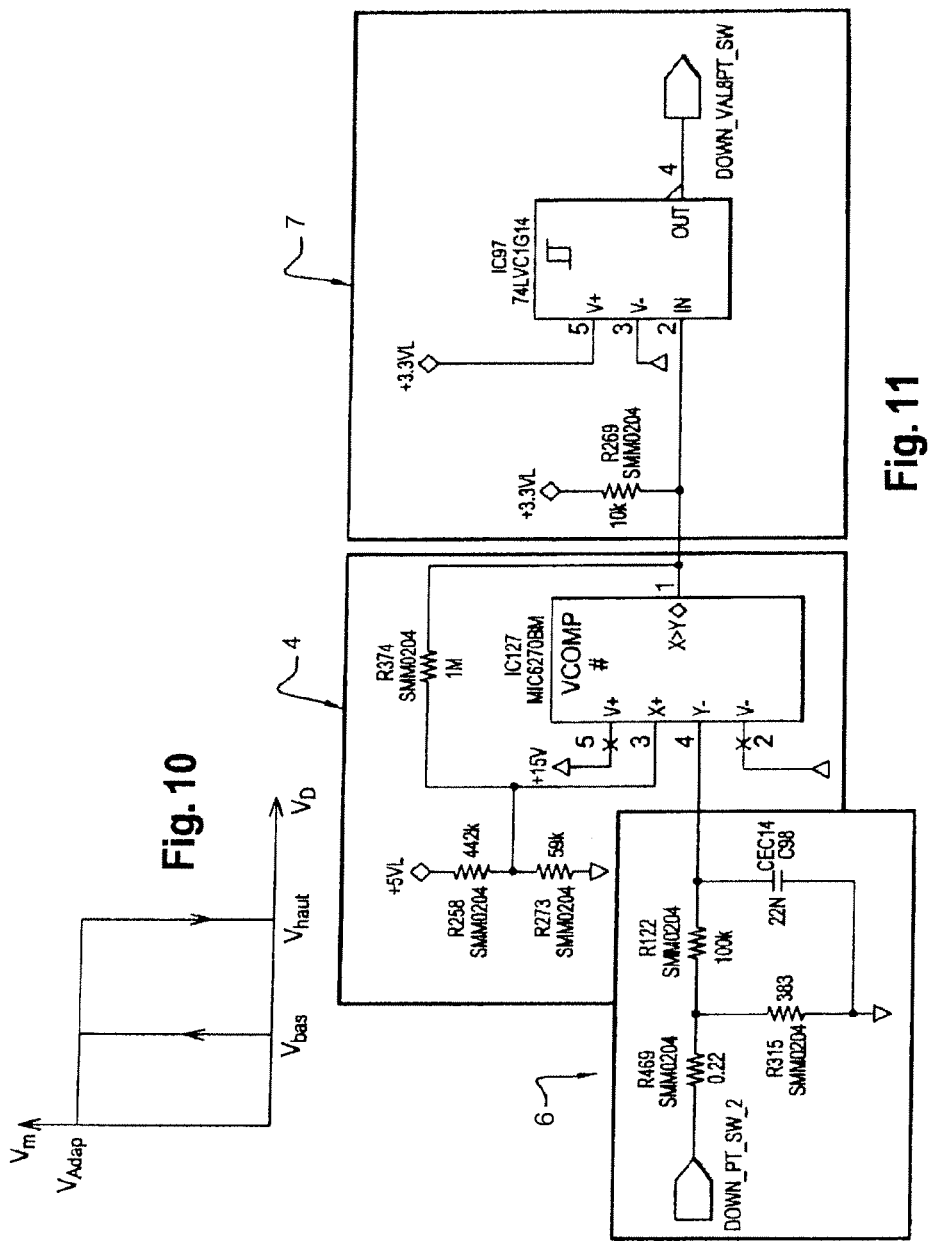

DEVICE FOR DETECTING THE STATE OF A SWITCH

CROSS REFERENCE TO RELATED APPLICATIONS

This application is the National Stage of International Application No. PCT/EP2007/053231, International Filing Date, 3 Apr. 2007, which designated the United States of America, and which International Application was published under PCT Article 21 (2) as WO Publication No. WO2007/113295 and which claims priority from French Application No. 0602915, filed on 4 Apr. 2006, the disclosures of which are incorporated herein by reference in their entireties.

BACKGROUND

The disclosed embodiments concern a device for detecting the state of a switch, allowing the closed and/or open state of a switch to be accurately detected. A switch in the disclosed embodiments is an electronic device allowing the passage of a current to be interrupted or allowed. Different types of switches exist, such as mechanically driven switches, electromagnetically driven switches, and relays. The disclosed embodiments apply to any type of switch for which there exists, between the open and the closed state, a measurable difference in the value of an electrical quantity, such as, for example, the voltage at the terminals of the switch, the switch resistance, the current passing through the switch, the power consumed by the switch, etc. Said electrical quantity characterizes the state of the switch.

In the normal state, when an open switch 1 (FIG. 1) is closed (FIG. 2), the voltage U at its terminals is zero (U=0) or practically zero. Therefore when the switch is not used frequently, it happens that it no longer operates properly: as FIG. 3 shows, the switch 1 exhibits at its terminals a non-negligible resistance 2, called $R_{Sw}$ in the closed state. The reasons for this are many: humidity, fouled contacts, etc. As FIG. 3 shows, the voltage U at the terminals of the switch is equal to the product of its resistance $R_{Sw}$ times the current strength I that crosses it (U=$R_{Sw}$I), according to Ohm's Law.

Consequences follow from this in the reading of information transmitted by the switch. Thus the information relating to the closure of the contact is not transmitted at the time desired or is not even transmitted at all. By way of example, pitch-trim sensors (switches) built into the joystick of a pilot or a co-pilot in an aircraft cockpit allow the aircraft pitch to be restored. In the event of the poor functioning of these sensors, the information stemming from the manipulation of the joystick no longer, or incorrectly, reaches the flight computers and may lead in particular to safety problems.

of the aspects of the disclosed embodiments are directed to accurately detecting the open and/or closed state of the switch in order for the information transmitted by the switch to be reliable and usable by the system receiving said information.

SUMMARY

The principle of the solution proposed consists of defining the closed state as the open state by crossing a threshold in the value of an electrical quantity characterizing the state of the switch and, for example, in the value of the switch resistance: the switch is considered to be closed when the value of the switch resistance is less than $R_{closed}$ (for example, 5 kΩ) and open when the value of the switch resistance is greater than $R_{open}$ (for example, 10 kΩ). The disclosed embodiments could equally use the value of the voltage at the terminals of the switch resistance: the switch is considered to be closed when the value of the voltage at the switch terminals is less than $V_{closed}$ and open when the value of the voltage at the switch terminals is greater than $V_{open}$.

The disclosed embodiments rely on a device for detecting the state of a switch, comprising a switch, a feed circuit of said switch being characterized by the fact that it includes a detection circuit which delivers a signal of a specified value ($V_{pullup}$) when the value of an electrical quantity ($R_{Sw}$) characterizing the state of the switch is less than a threshold called the lower threshold ($R_{closed}$) and/or a signal of a different value when the value of said electrical quantity is greater than a threshold different from the lower threshold, called the upper threshold ($R_{open}$).

One of the advantages of the device according to the disclosed embodiments is the accuracy of detecting the open or closed state of the switch, whatever the physical degradation of the switch. Even if the switch exhibits resistance in the closed state, the device detects said state by the passage of a current.

In a particular embodiment of the device in the disclosed embodiments, said electrical quantity is the resistance $R_{Sw}$ of the switch and the detection circuit (4) delivers a signal when the value of the resistance is less than a lower resistance threshold (R<$R_{closed}$), and/or a signal of a different value when the value of the resistance is greater than an upper resistance threshold (R>$R_{open}$).

One of the signals indicates the state of closure and the other signal the open state.

Thus, the device according to the disclosed embodiments indicates clearly and accurately the open and closed state of the switch.

According to said particular embodiment, the detection circuit delivers as output two values of different amounts, a first value for which the switch is considered to be in the closed state, when the resistance $R_{Sw}$ is less than a first resistance threshold (R<$R_{closed}$) and a second value for which the switch is considered to be in an open state when the resistance $R_{Sw}$ is greater than a second resistance threshold (R>$R_{open}$).

According to a particular embodiment of the device, the device includes an adjustment circuit which delivers a voltage, a function of the input switch resistance of said detection circuit.

According to a particular embodiment of the detection circuit according to the disclosed embodiments, the detection circuit includes a hysteresis circuit which delivers a first output-voltage value ($V_D=V_{pullup}$) for an input voltage less than a first voltage threshold ($V_{HY High}$ and a second output-voltage value ($V_D=0$) for an input voltage greater than a second voltage threshold ($V_{HY Low}$). The hysteresis circuit includes a feed and resistances with values such that it provides a current allowing the contact of the switch to be cleaned.

According to a particular embodiment of the adjustment circuit according to the disclosed embodiments, the adjustment circuit includes a voltage divider, which delivers an output voltage as a function of the value of the switch resistance, as well as including resistances and a feed.

According to a particular application, the disclosed embodiments concern a flight-control system equipped with a device for detecting the state of a switch according to the disclosed embodiments.

According to a particular application, the disclosed embodiments concern an aircraft equipped with a device for detecting the state of a switch according to the disclosed embodiments.

BRIEF DESCRIPTION OF THE DRAWINGS

Other aspects, advantages, and characteristics of the disclosed embodiments will appear in reading the following description of the device according to the disclosed embodiments, given as a non-restrictive example, in reference to the figures attached below, in which:

FIG. 10 is a diagram representing the operation of the embodiment of the shaping circuit represented in FIG. 9, that is, the output-voltage values as a function of the input-voltage values of said shaping circuit;

FIG. 11 is a representation of an electronic schematic of an embodiment of the device according to the disclosed embodiments.

DETAILED DESCRIPTION

The device 3 according to the disclosed embodiments aims to detect and communicate the states of a switch 1: the closed state and the open state. In order to do this, the device 3 according to the disclosed embodiments is based an electrical quantity characterizing the state of the switch 1, such as, for example, the voltage at the terminals of the switch 1 (U=O when the switch is closed; U< >0 when the switch is open), the resistance of the switch ($R_{sw}$=0 when the switch is closed; $R_{sw}$< >0 when the switch is open), the current passing through the switch (I=O when the switch is open; I< >0 when the switch is closed), etc.

Figure 1:
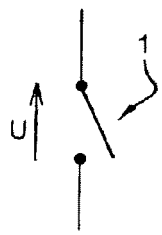
FIGS. 1 and 2 are a schematic and theoretical representation of a switch in the open state and the closed states, respectively.
Figure 2:
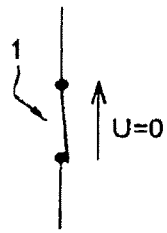
Figure 3:
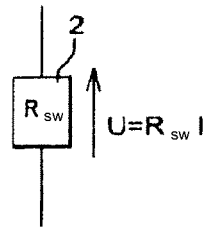
FIG. 3 represents schematically a switch in the closed state, which exhibits in an actual situation a non-negligible resistance.
Figure 4:
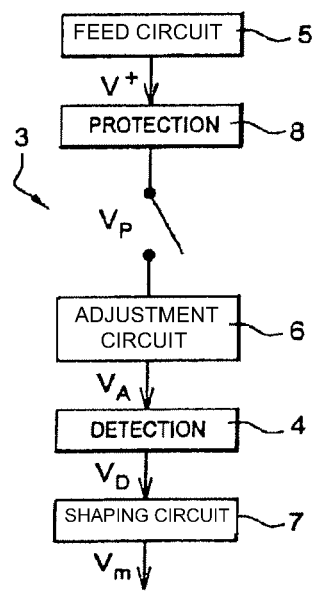
FIG. 4 is a simplified schematic representation of different circuits which comprise the device according to the disclosed embodiments.

As illustrated in FIG. 4, the disclosed embodiments include a detection circuit 4 which delivers a signal of specified value indicating the open (or closed) state when the value of said quantity is less than a threshold and/or a signal of different value indicating the closed (or open) state when the value of said electrical quantity is greater than a second threshold different from the first. In this way, despite the existence of a resistance or a non-zero voltage at the terminals of a closed switch, the device detects the closed state of the switch by the intermediary of the threshold (U<$U_{threshold}$ or R<$R_{threshold}$).

The device 3 represented in FIG. 4 includes a detection circuit 4 of a switch 1 supplied by a feed circuit 5, and optionally an adjustment/filtering circuit 6, a shaping circuit 7, and a protection circuit 8.

The adjustment circuit 6 in particular allows the signal transmitted to the detection circuit 4 to be made to depend on the quantity characterizing the state of the switch. The shaping circuit 7 modifies the signal delivered by the detection circuit 4 in order to be read by the circuit before receiving the information relating to the state of the switch. The protection circuit 8 protects the feed circuit 5 of the switch 1.

In the particular embodiment illustrated in FIGS. 5 to 11, the disclosed embodiments consist of a detection circuit 4 allowing a first signal to be delivered corresponding to the closed state when the value of the switch resistance is less than a threshold $R_{closed}$ ($R_{Sw}$<$R_{closed}$) and a second signal to be delivered corresponding to the open state when the value of the switch resistance is greater than a threshold $R_{open}$ ($R_{Sw}$>$R_{open}$) different from said threshold $R_{closed}$. There exists a range of switch-resistance values for which the state is undefined, between $R_{closed}$ and $R_{open}$. The circuits may be designed to indicate the closed state when the value of the switch resistance is greater than a threshold $R_{open}$ ($R_{Sw}$>$R_{open}$) and the open state when the value of the switch resistance is less than a threshold $R_{closed}$ ($R_{Sw}$<$R_{closed}$), different from said threshold $R_{open}$. In the embodiment examined above and as will be understood later, it is sufficient, for example, to reverse the trigger circuit represented in FIG. 9.

The switch 1 is supplied by a feed circuit 5, as represented in FIG. 4.

In order to detect the value of the switch resistance, the disclosed embodiments include an adjustment circuit 6 which with the feed circuit 5 allows the quantity (for example, a voltage $V_A$) transmitted to the detection circuit 4 to be made to depend on the resistance of the switch $R_{Sw}$. The adjustment circuit adjusts the quantity characterizing the state of the switch (in the example illustrated, $R_{Sw}$) for the transmission to the detection circuit 4 (in the example illustrated, through a voltage $V_A$). The adjustment circuit 6 likewise has the function of causing sufficient current to pass in the switch resistance $R_{Sw}$ in the closed state to "clean the contact of the switch".

The adjustment circuit 6 is optional. Actually, in some embodiments, the adjustment circuit 4 can directly detect the quantity characterizing the state of the switch (when the quantity used is a voltage, for example).

The device 3 optionally includes a shaping circuit 7 allowing the adjustment of information communicated by the detection circuit 4 (for example, a voltage $V_D$) with the system intended to receive it, as, for example, in the preceding case mentioned of the pitch-trim sensor, adjustment to the constraints imposed by the computer. In the example illustrated, the sensor is connected to the flight computer through a field-programmable gate array (FPGA). The circuit 7 shapes the signal delivered by the adjustment circuit 6 $V_A$ in order to be read by the FPGA. Indeed, the FPGA requires rapid rising and falling slopes, depending on the type of component. The shaping circuit adjusts the slopes for reading by the FPGA.

Figure 5:
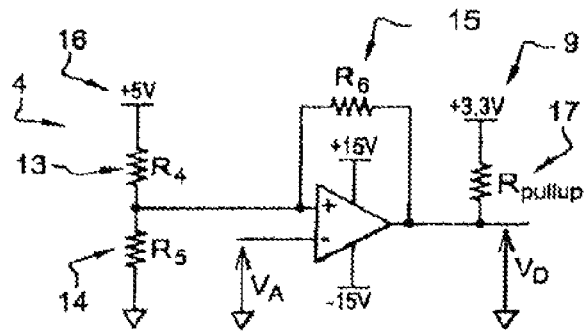
FIG. 5 is a representation of an electronic schematic of an embodiment of the detection circuit represented in FIG. 4.
Figure 6:
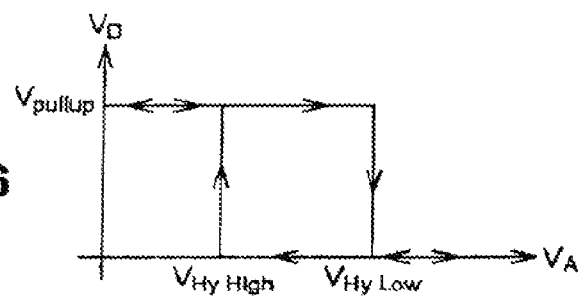
FIG. 6 is a diagram representing the operation of the embodiment of the detection circuit represented in FIG. 5, that is, the output-voltage values as a function of the input-voltage values of said detection circuit.

According to a particular illustrative embodiment represented in FIG. 5, the detection circuit 4 includes a hysteresis comparator 9. FIG. 6 represents the voltage $V_D$ delivered by the hysteresis comparator as a function of the input voltage $V_A$. The detection circuit 4 delivers an output voltage $V_D$ which depends on the input voltage $V_A$ present. In the present embodiment, as will be described in detail later, the adjustment circuit 6 and the feed circuit 5 allow an input voltage $V_A$ to be delivered from delivered to the detection circuit 4, which is a function of the resistance of the switch ($R_{SW}$). Thus, the detection circuit 4 delivers as output a signal $V_D$ which is a function of the switch resistance $R_{SW}$. The values of the components, and in particular of the resistances and feeds included in the two circuits, are chosen in such a way as to detect the resistances desired, in order to define the open and closed states.

The description that follows describes in more detail the operation of each of the circuits in the embodiments represented in FIGS. 5 to 11.

Figure 7:
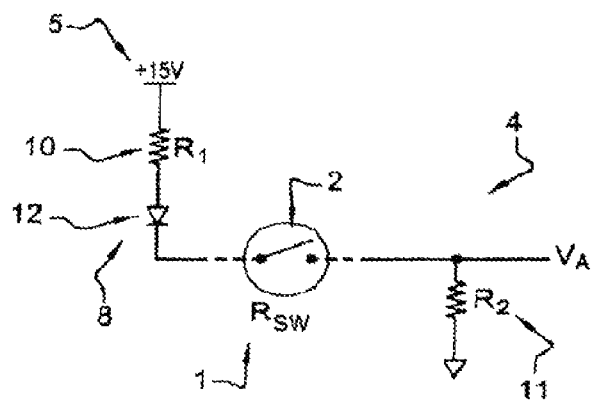
FIG. 7 is a representation of an electronic schematic of an embodiment of the adjustment circuit represented in FIG. 4.

As shown in FIG. 7, the protection circuit 8 and the adjustment circuit 6 are not separated as illustrated in FIG. 4. According to the embodiments, the circuits that achieve the functions illustrated in FIG. 4 can be organized differently. The switch 1 is fed by a +15V feed circuit 5. The feed voltage and/or the values of resistances 10 ($R_1$) and 11 ($R_2$) are adjusted in such a way as to provide sufficient current to "clean the contact of the switch". The adjustment circuit 6 allows for reading the resistance of the switch 1, $R_{sw}$, through a resistive bridge made up of the resistances 10 ($R_1$), 2 ($R_{sw}$), and 11 ($R_2$), the feed 5, and the voltage delivered to the detection circuit 4, $V_A$.

The voltage $V_A$ has a known value for a voltage divider of the type illustrated in FIG. 7:

$$V_A = \frac{+15 * R2}{R1 + R2 + Rsw}$$

The voltage $V_A$ delivered to the detection circuit 4 is thus a function of the resistance 2 of the switch $R_{Sw}$.

The adjustment circuit 6 includes a diode 12 between the feed 5 of the switch and the input to the switch 1. In the embodiment illustrated, the diode 12 is located between the output of the resistance 10 and the input of the switch 1. The diode protects the feed 5 of the switch 1 from any voltages $V_A$ that are too high (in the present case, higher than +15 V) which may be inadvertently applied to the diode 12 when the switch 1 is not connected to the detection circuit 4. The input voltage $V_A$ delivered from the detection circuit 4 then has the value of:

$$V_A = \frac{(+15 - Vd) * R2}{R1 + R2 + Rsw}$$

and therefore always depends on the resistance 2 of the switch ($R_{Sw}$).

The feed 5 must likewise be protected from connection to the supply of the diode 12: in this case, it involves a short-circuit to the feed supply. The values of the resistances are chosen for that purpose to avoid the resistance 10 being drained of too much power.

The values of the resistances $R_1$ and $R_2$ are chosen in order to have a minimum current as said "cleaning current" (for example, on the order of 10 mA) circulating in the switch 1 in the closed position and a voltage $V_A$ which is not too large with respect to the voltage allowed by the hysteresis circuit (for example, on the order of 5 V). Therefore the current circulating in the switch is:

$$I = \frac{+15 - Vd}{R1 + R2 + Rsw}$$

The resistances 10 and 11 ($R_1$ and $R_2$) are therefore chosen in the example illustrated in order that I>10 mA and U<5 V when the resistance of the switch tends toward zero. It is actually necessary that the voltage $V_A$ not be greater than the voltage allowed by the hysteresis comparator.

Figure 8:
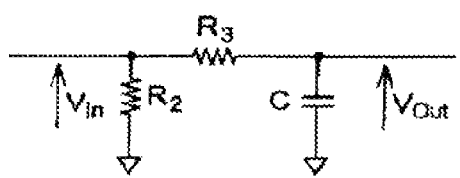
FIG. 8 is a representation of an electronic schematic of a portion of the adjustment circuit complementary to that represented in FIG. 7.

The adjustment circuit 6 can also carry out the function of filtering. FIG. 8 represents a filtering subassembly to be connected to the output of the circuit represented in FIG. 7.

The resistance $R_2$ of the circuit represented in FIG. 8 corresponds to that represented in FIG. 7. As has been previously seen, it enters into the calculation of the voltage $V_A$. The $R_3C$ network presented in FIG. 8 is a cutoff frequency filter:

$$f_c = \frac{1}{2\pi \cdot R_3 \cdot C}$$

According to a particular embodiment, the resistance $R_3$ is fixed at 100 kΩ. The value of the capacitance C must therefore be equal to 22 nF, such that the output cutoff frequency of this group is between 50 Hz and 100 Hz. The cutoff frequency obtained is low, so as to filter any rebounds at the switch or stemming from errors in manipulation.

Figure 9:
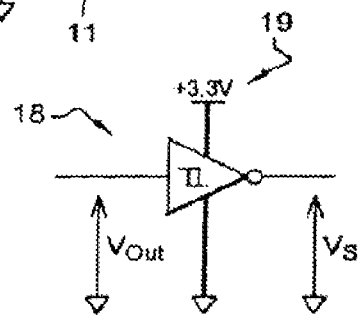
FIG. 9 is a representation of an electronic schematic of an embodiment of the shaping circuit represented in FIG. 4.

The voltage $V_A$, which is a function of the value of the switch resistance 2, is, as has been previously seen, applied to the input of the hysteresis circuit 9. As FIG. 9 shows, representing the output-voltage values as a function of the input-voltage values of the hysteresis circuit, the output voltage $V_D$ assumes two different values, depending on the input voltage $V_A$. When the input voltage $V_A$ is less than $V_{Hy\ High}$, the output voltage of the circuit $V_D$ is equal to $V_{pullup}$ and when the input voltage $V_A$ is greater than $V_{Hy\ Low}$, the output voltage of the circuit is equal to zero. The hysteresis circuit thus allows the open and closed states of the switch to be accurately detected. As previously seen, the switch is considered to be closed when the switch resistance $R_{Sw}$ is less than the threshold value $R_{closed}$ (linked to $V_{Hy\ High}$) (for example, 5 kΩ). When the switch resistance $R_{Sw}$ is less than the threshold value $R_{closed}$ (linked to $V_{Hy\ Low}$):

the input voltage of the hysteresis circuit, being equal to the output voltage $V_A$ of the adjustment circuit and therefore a function of the switch resistance $R_{Sw}$ (and, more accurately, of $1/R_{Sw}$, according to the equation expressed above), is greater than a voltage threshold $V_{Hy\ Low}$;

the output voltage of the hysteresis circuit is then equal to 0.

Thus, when the output voltage of the hysteresis circuit 9 is equal to 0, the switch is considered to be closed, because it is sending an output signal from the shaping circuit 7 (trigger 18), as will be seen later in the embodiment described, which corresponds to a high state.

If the switch resistance $R_{Sw}$ remains less than the second threshold value $R_{open}$ or if the input voltage of the hysteresis circuit is greater than the threshold voltage $V_{Hy\ High}$, the output voltage of the hysteresis circuit is equal to 0. The switch is considered to be closed.

Similarly, the switch is considered to be open when the switch resistance $R_{Sw}$ is greater than the threshold value $R_{open}$ (for example, 10 kΩ). When the switch resistance $R_{Sw}$ is greater than the threshold value $R_{open}$, the input voltage of the hysteresis circuit, being equal to the output voltage $V_A$ of the adjustment circuit and therefore a function of the switch resistance $R_{Sw}$ (and more accurately, of $1/R_{Sw}$, according to the equation expressed previously), is less than a voltage threshold $V_{Hy\ High}$;

the output voltage of the hysteresis circuit is then equal to $V_{pullup}$.

Thus, when the output voltage of the hysteresis circuit 9 is equal to $V_{pullup}$ the switch is considered to be closed, because it is sending an output signal from the shaping circuit 7 (trigger 18), as will be seen later in the embodiment described, which corresponds to a low state.

If the switch resistance $R_{Sw}$ remains greater than the second threshold value $R_{closed}$ or if the input voltage of the hysteresis circuit is less than the voltage threshold $V_{Hy\ Low}$, the output voltage of the hysteresis circuit is equal to $V_{pullup}$. The switch is considered to be open.

Thus, when the switch resistance $R_{Sw}$ is between the closed threshold value $R_{closed}$ and the open threshold value $R_{open}$ or is equal to these threshold values, the output voltage of the hysteresis circuit retains the value of the previous state.

If, when put into operation or during reinitialization or the equivalent, the resistance assumes a value between $R_{open}$ and $R_{closed}$, the circuit delivers a value by default. A time delay is provided for downstream of the device involved, to allow it time to deliver a signal corresponding to the state of the switch.

The table below links the output voltage of the circuit 4, $V_D$, with the values of the input voltage, thus bearing information on the value of the switch resistance:

|  | Switch resistance | Voltage, $V_A$ | Voltage, $V_D$ |
|---|---|---|---|
| Switch closed | $<R_{closed}$ (5 kΩ) | $>V_{Hy\ Low}$ | 0 V |
| Switch open | $>R_{open}$ (10 kΩ) | $<V_{Hy\ High}$ | $V_{pullup}$ |
| Switch closed | $R_{closed} \leq R \leq R_{open}$ and VD(t − 1) = 0 | $>V_{Hy\ Low}$ | 0 V |
| Switch open | $R_{closed} \leq R \leq R_{open}$ and $V_D(t − 1) = V_{pullup}$ | $<V_{Hy\ High}$ | $V_{pullup}$ |

$V_D(t-1)$ signifies the value of $V_D$ at the preceding moment in time.

The resistances $R_{closed}$ and $R_{open}$ are chosen in such a way as to deliver a signal corresponding to the exact state of the switch. Thus, if for the switch selected, the threshold value $R_{closed}$ below which the switch is considered to be closed by the designer is 4 kΩ, the value chosen could be 5 kΩ, for example, in order to ensure a margin of error. On the other hand, the threshold values will be chosen such that no overlap is possible between them: it will not be possible to have $R_{closed} \leq R_{open}$. Thus, each resistance value is representative of a unique state of the switch. In this way, the device delivers accurate and reliable information on the open or the closed state of the switch.

The hysteresis thresholds $V_{Hy\ Low}$ and $V_{Hy\ High}$ are obtained in a known manner using the traditional equations which depend on resistances and feed of the hysteresis circuit 9 represented in FIG. 5:

$$V_{HyHigh} = \frac{5R_5R_6}{R_4R_5 + R_4R_6 + R_5R_6}$$

$$V_{HyLow} = \frac{5R_5R_6}{R_4R_5 + R_4R_6 + R_5R_6} + \frac{3.3R_4R_5}{R_4R_5 + R_4R_6 + R_5R_6}$$

The values of the resistances 13 ($R_4$), 14 ($R_5$), and 15 ($R_6$) and of the feed 16 (here, +5V) of the hysteresis circuit are therefore chosen in such a way as to have a voltage $V_{HyLow}$ corresponding to a switch resistance of $R_{closed}$=5 kΩ and a voltage $V_{Hy\ High}$ corresponding to a switch resistance of $R_{open}$=10 kΩ. The threshold values of 5 kΩ and 10 kΩ are chosen so as to characterize as well as possible the open and closed state of said resistance after it has been tested. These values are therefore given by way of illustration and should not be restrictive in any case. The voltage values $V_{HyLow}$ and $V_{Hy\ High}$ are obtained with the formula given above:

$$V_{HyLow} = \frac{(+15 - Vd) * R2}{R1 + R2 + Rsw} \text{ with } R_{sw} = R_{closed} = 5K\Omega$$

$$V_{HyHigh} = \frac{(+15 - Vd) * R2}{R1 + R2 + Rsw} \text{ with } R_{sw} = R_{open} = 10K\Omega$$

The resistance 17, $R_{pullup}$ (FIG. 5), must be less than the resistance 15 ($R_6$), so as not to have the output voltage from the hysteresis comparator $V_D$ fall when it is in the high state (equal to $V_{pullup}$).

According to an illustrative embodiment, the shaping circuit 7 (FIG. 4) includes a Schmitt trigger circuit 18. A representation of the circuit 18 of a well-known type is given in FIG. 9. The circuit 18 raises the output level of voltage $V_D$ from the detection circuit 4 so as, if necessary, to render it compatible with the circuit receiving the output voltage $V_D$ as input. In the example used above in the present description, the switch is a position sensor connected to a flight computer through an FPGA. The output voltage $V_D$ from the detection circuit is raised with the aid of the trigger circuit 18 in order to optimize the processing of data and, in the example illustrated, as was seen previously, to improve the rising and falling slopes. The levels of the output-voltage threshold of the trigger depend on the feed 19, which may be +3.3 volts or another value. The threshold $V_{high}$ of the trigger circuit 18 is chosen such that $V_{pullup} > V_{high}$.

FIG. 10 represents the output-voltage values of the trigger as a function of the input-voltage values. When the input voltage is equal to 0, the output voltage is equal to $V_{adjust}$; the switch is considered to be closed. When the input voltage is equal to $V_{pullup}$ ($V_{pullup}$ being greater than $V_{high}$), the output voltage is equal to 0; the switch is considered to be open. The voltage $V_{adjust}$ is raised relative to the voltage $V_{pullup}$ in order to adjust it during transmission to the circuit receiving the voltage $V_m$.

FIG. 11 represents an example of an embodiment of the device 3. The device 3 includes an adjustment circuit 6, a detection circuit 4, and a shaping circuit 7.

The invention claimed is:

1. A device for detecting the state of a switch, including a switch and a feed circuit of said switch, the device comprising:
 a detection circuit which delivers at least one of:
  a first signal of a first specified value when the value of an electrical quantity characterizing the state of the switch is any value less than a lower threshold value at a terminal of the detection circuit; and
  a second signal of a second specified value, different than the first value of the first signal, when the value of said electrical quantity is any value greater than an upper threshold value, different from the lower threshold value at the same terminal of the detection circuit as the first signal;
 the device further comprising said feed circuit and an adjustment circuit that includes a voltage divider having resistors, a voltage delivered by the adjustment circuit to the detection circuit being made dependent on a resistance of the switch, the adjustment circuit allowing for reading the resistance of the switch through the voltage divider, the feed circuit, and the voltage delivered to the detection circuit; and
 wherein at least one of:
  a voltage of the feed circuit, and
  values of the resistors of the voltage divider,
 are adjusted in such a way to provide sufficient current to clean a contact of the switch based on the reading, and wherein the detection circuit includes a hysteresis circuit which delivers a first output-voltage value for an input voltage less than a first voltage threshold and a second, different output-voltage value for an input voltage greater than a second voltage threshold, and the first output-voltage value is determined based on a following expression:

$$V_{HyHigh} = \frac{AR_5R_6}{R_4R_5 + R_4R_6 + R_5R_6}$$

and the second output-voltage value is determined based on a following expression:

$$V_{HyLow} = \frac{AR_5R_6}{R_4R_5 + R_4R_6 + R_5R_6} + \frac{BR_4R_5}{R_4R_5 + R_4R_6 + R_5R_6}$$

wherein $V_{Hy\ High}$ denotes the first voltage threshold, $V_{Hy\ Low}$ denotes the second voltage threshold, A denotes a first constant value, B denotes a second constant value, $R_4$ denotes a first resistance value of the hysteresis circuit, $R_5$ denotes a second resistance value of the hysteresis circuit, and $R_6$ denotes a third resistance value of the hysteresis circuit.

2. A device according to claim 1, further comprising that, when the value of the electrical quantity is between the lower-threshold value and the upper-threshold value or is equal to the lower and upper threshold values, the detection circuit delivers a signal identical to that of a previous state.

3. A device according to claim 1, further comprising that said electrical quantity is the resistance of the switch and that the detection circuit delivers both of:
the first signal of specified first value when the value of the resistance is less than a lower resistance threshold; and
the second signal of the second, different value when the value of the resistance is greater than an upper resistance threshold.

4. A detection device according to claim 1, further comprising that one of the first and second signals indicates the closed state and the other signal the open state of said switch.

5. A device according to claim 1, wherein the hysteresis circuit includes further feed and resistances with values such that the hysteresis circuit provides a current sufficient to clean the contact of the switch.

6. A flight control system, comprising a device according to claim 1.

7. An aircraft, comprising a device according to claim 1.

8. A device according to claim 1, wherein the switch is considered to be open when the resistance value of the switch is greater than 10 kΩ.

9. A device for detecting the state of a switch, including a switch and a feed circuit of said switch, the device comprising:
a detection circuit which delivers at least one of:
a first signal of a first specified value when the value of an electrical quantity characterizing the state of the switch is any value less than a lower threshold value at a terminal of the detection circuit; and
a second signal of a second specified value, different than the first value of the first signal, when the value of said electrical quantity is any value greater than an upper threshold value, different from the lower threshold value at the same terminal of the detection circuit as the first signal;
the device further comprising said feed circuit and an adjustment circuit that includes a voltage divider having resistors, a voltage delivered by the adjustment circuit to the detection circuit being made dependent on a resistance of the switch, the adjustment circuit allowing for reading the resistance of the switch through the voltage divider, the feed circuit, and the voltage delivered to the detection circuit; and
wherein at least one of:
a voltage of the feed circuit, and
values of the resistors of the voltage divider,
are adjusted in such a way to provide sufficient current to clean a contact of the switch based on the reading; and
the device further comprising a cutoff frequency filter having a resistor and a capacitor, wherein the resistance value of the resistor is fixed at approximately 100 kΩ, and a capacitance value of the capacitor is substantially equal to 22 nF.

10. A device according to claim 9, wherein the resistance values of the first resistor and the second resistor are selected such that the cleaning current is greater than 10 mA and a voltage at terminals of the switch is less than 5 V when the resistance of the switch tends toward zero.

11. A device according to claim 9, wherein an output frequency of the cutoff frequency filter ranges between 50 Hz and 100 Hz.

* * * * *